3,528,995
SUBSTITUTED PERHALOCOUMALINS AND
DERIVATIVES THEREOF
Victor Mark, Ransomville, and Leon Zengierski, North Tonawanda, N.Y., assignors to Hooker Chemical Corporation, Niagara Falls, N.Y., a corporation of New York
No Drawing. Filed Oct. 12, 1966, Ser. No. 586,056
Int. Cl. C07d 7/16
U.S. Cl. 260—343.5                                  8 Claims

ABSTRACT OF THE DISCLOSURE

Perhalocoumalins of the structure

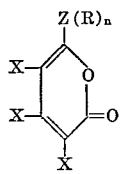

are described
wherein X is a halogen selected from the group consisting of chlorine and bromine,
$(R)_nZ$ is a substituent in which the following relationship exists;

| If $n$ is— | Z may be— |
|---|---|
| 0 | Iodine. |
| 1 | Oxygen, sulfur. |
| 2 | Nitrogen. |
| 3 | Carbon. | and wherein R is selected from the group consisting of (a) hydrogen; (b) alkyl groups of 1 to 18 carbon atoms, provided that when Z is oxygen the alkyl groups from which R may be selected contain from 6 to 18 carbon atoms; (c) substituted alkyl groups of 1 to 18 carbon atoms wherein the substituents are selected from the group consisting of chlorine or bromine; (d) alicyclic groups containing from 5 to 18 carbon atoms; (e) aromatic and aralkyl groups containing from 6 to 18 carbon atoms.

These compounds are prepared by reacting the perhalogenated precursor with a compound of the formula $(R)_mZH$ in the presence of a base which is less nucleophilic than the reactant $(R)_nZH$.

The compounds are useful as pesticides, bacteriacides, fungicides or miticides.

---

This invention relates to new compounds, to processes for their preparation, and to the uses to which said compounds may be put. More specifically the invention relates to novel substituted halogenated coumalins and the derivatives thereof, to novel methods for producing said compounds, and to the fungicidal, bactericidal, insecticidal, pesticidal uses of said compounds.

In accordance with this invention there are provided compounds of the formulae:

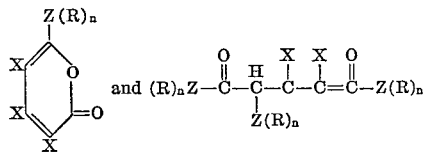

wherein X is a halogen chosen from the group consisting of fluorine, chlorine, bromine, and iodine and mixtures thereof $(R)_nZ$ is a substituent in which the following relationship exists:

| If $n$ is— | Z may be— |
|---|---|
| 0 | Bromine, iodine, fluorine. |
| 1 | Oxygen, sulfur, selenium. |
| 2 | Nitrogen, arsenic. |
| 3 | Carbon. | and wherein R is selected from the group consisting of hydrogen alkyl groups of 1 to 18 carbon atoms in any of their isomeric forms provided that when Z is oxygen the alkyl groups from which R may be selected contain from 6 to 18 carbon atoms, substituted alkyl groups of 1 to 18 carbon atoms wherein the substituents are selected from the group consisting of fluorine, chlorine, bromine, iodine, sulfur, oxygen, phosphorus, nitrogen, and silicon; alicyclic groups containing from 5 to 18 carbon atoms; heterocyclic groups containing from 5 to 18 carbon atoms wherein the hetero atom(s) is selected from the group consisting of oxygen, sulfur, nitrogen, phosphorus, and silicon; and aromatic and aralkyl groups containing from 6 to 18 carbon atoms.

In a preferred embodiment of the invention, Z is sulfur, X is chlorine, and R is an alkyl group of 1 to 12 carbon atoms, preferably of 1 to 5 carbon atoms, such as methyl, ethyl, propyl, isopropyl, n-butyl, sec-butyl, and tert-butyl, most preferably of 1 carbon atom, methyl.

There is further provided a process for producing the aforementioned compounds by reacting a perhalocoumalin with a nucleophile in the presence of a base, as shown by the equations below:

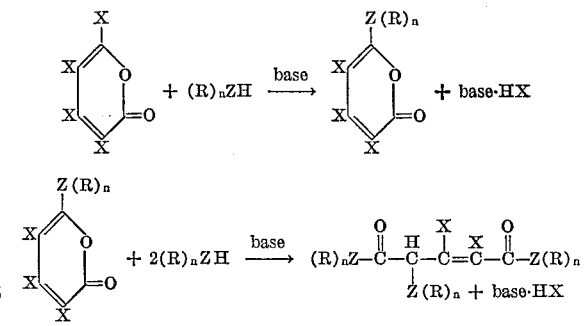

wherein R, $n$, and X are as hereinbefore defined, provided that when $n$ is 0, X is selected from the group consisting of fluorine, chlorine, and bromine, and the following relationship exists:

| If X is— | Z may be— |
|---|---|
| Fluorine | Chlorine, bromine, iodine. |
| Chlorine | Bromine, iodine. |
| Bromine | Iodine. |

The compounds so prepared exhibit a wide spectrum of pesticidal activity.

Any base which itself is not a strong nucleophilic precursor may be used as a coreagent. Thus tertiary amines may be used, and are the preferred class of bases, but a secondary or primary amine can be used if it is a relatively weak nucleophile precursor in comparison with the primary reacting species. Similarly, alkali or alkaline earth hydroxides, basic alkali salts, alkoxides, and salts of strong bases and weak acids may be used, provided their nucleophilicity is low compared to that of the reactant species.

A secondary amine which is a relatively strong nucleophile precursor may be used as the reactant species, and the reaction will proceed inasmuch as secondary amines act as both nucleophile precursors and bases, as illustrated by the equation shown below:

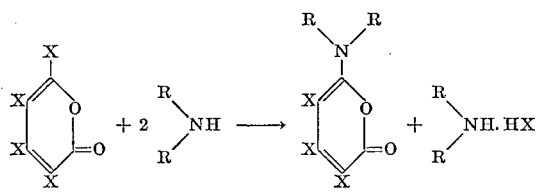

The perhalocoumalin is dissolved in a solvent, usually under ambient conditions, before it is made to react with the nucleophile precursor. In general, any polar or non-polar solvent may be used. However, it is not desirable to use a solvent which itself will form a strong nucleophile with the base (such as, e.g., alcohols, amines) to avoid possible competing reactions.

The preferred solvents are ethers, e.g. tetrahydrofuran, diethylether, and the like. Other suitable solvents include benzene, acetone, methylene chloride, carbon disulfide, dimethylsulfide, dimethyl sulfoxide, and the like.

Once the perhalocumalin is dissolved, it is made to react with the nucleophile precursor and base. When one is preparing the mono-substituted perhalocoumalin, about 1 mole perhalocoumalin is reacted with each mole of nucleophile precursor and with an excess of base though it is preferred to use a substantially equimolar amount of perhalocoumalin and nucleophile precursor. When one is preparing the tri-substituted derivative of glutaconic aicd, about 1 mole of perhalocoumalin is reacted with 3 or more moles of nucleophile precursor and 2 or more moles of base, though it is preferred to use about 3 moles of nucleophile precursor for every mole of perhalocoumalin.

During the addition the temperature of the reaction mixture is maintained at 0 to 180 degrees centigrade, usually by cooling. A more preferred range is from 0–30 degrees centigrade, and an even more preferred range is from 20–30 degrees centigrade.

Pressure other than atmospheric is not required for this reaction. However, higher than atmospheric pressure may be used, when the nucleophile precursor is a gas at the reaction temperature.

Generally, the nucleophile precursor is added to the perhalocoumalin, followed by the addition of the base. However, where convenient one may add the perhalocoumalin to the nucleophile precursor, and then add the base; alternatively, one may first add the base to the perhalocoumalin, and then add the nucleophile precursor thereto, and this method is preferred e.g., when the nucleophile precursor is a gas. When working with secondary amines, which act as both nucleophile precursors and bases, one preferably proceeds by adding them to the perhalocoumalins.

The reaction takes from about 10 minutes to 24 hours, being dependent upon the reactivity of the nucleophile generated from the percusor, the concentration of the nucleophile precursor, and the concentration of the perhalocoumalin. Often, the reaction rate is fast and it is completed upon the mixing of the reagents. After the addition is completed the reaction slurry is filtered and the solvent evaporated from the filtrate or the solvent can be evaporated, first and the resulting mixture triturated with water and the solids filtered off and dried. If the coumalin derivative is a liquid it can be isolated by filtration of the reaction slurry followed by evaporation of the solvent and distillation. Solid products may be purified by recrystallization from a solvent such as hexane, benzene, ethyl acetate, chloroform and the like.

In addition to making the tri-substituted derivatives of glutaconic acid in the manner described above, in which all of the $(R)_nZ$ groups are identical, one may alternatively make the mono-substituted perhalocoumalin using one nucleophile precursor, and then subject the mono-substituted perhalocoumalin to reaction with another nucleophile precursor. The equations presented below illustrate this.

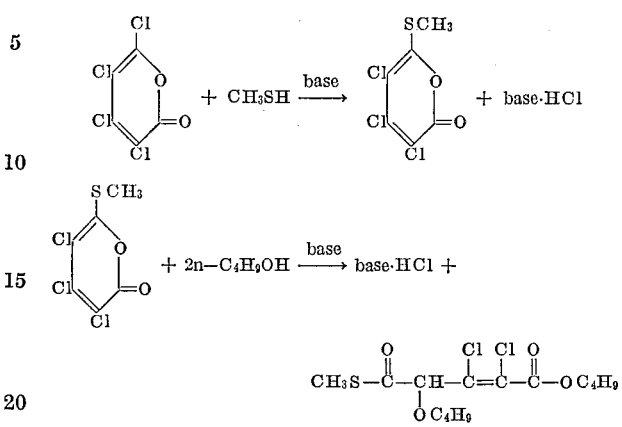

Once the substituted perhalocoumalin products are made, various additional useful derivatives can be obtained. For example, 6-methylthio-3,4,5-trichloro-2H-pyran-2-one may be oxidized to the sulfonate or sulfoxide, as illustrated below:

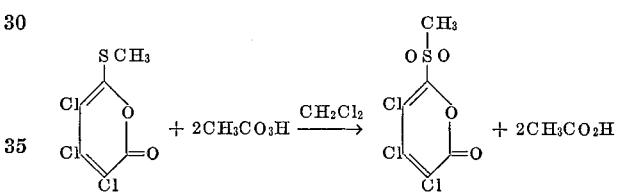

The compounds of this invention are useful as chemical intermediates. They are also useful as fungicides, bactericides, and pesticides, as illustrated in Examples 13–33.

The following examples are presented as illustrative of the invention, and are not deemed to be limitative thereof. Unless otherwise specified, parts are by weight and temperatures are in degrees centigrade.

EXAMPLE 1

To a solution of 23:4 parts of perchlorocoumalin and 10.1 parts of triethylamine (in 140 parts of diethylether) were gradually added 5.0 parts of methyl mercaptan. The addition took place over a period of about 30 minutes and during said addition the temperature was maintained at 20–30 degrees centigrade. After completion of the addition, the solvent was evaporated and the residue was triturated with water, which water dissolved the amine hydrochloride and left behind the substituted coumalin. Said substituted coumalin was then recrystallized from hexane, quantitatively yielding yellow crystals which melted at 88–89.5 degrees centigrade. Elemental analysis of the product disclosed that it contained 29.38 percent carbon, 1.23 percent hydrogen, 43.5 percent chlorine, and 12.95 percent sulfur, indicating that the compound had the formula

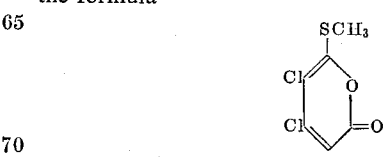

EXAMPLES 2–11

In Examples 2–11 the basic procedure specified in Example 1 was followed, but different reactants and/or different concentrations of reactants were used, as specified in Table I.

TABLE I

| Ex. No. | Nucleophile Precursor | | | | Product | | | |
|---|---|---|---|---|---|---|---|---|
| | Formula | Parts used | Parts of perhalo-coumalin | Base | Parts used | Empirical formula | Parts obtained | Yield percent | M.P., °C. or B.P., °C. mm. |
| 2 | n-C$_4$H$_9$SH | 9.02 | 23.4 | (C$_2$H$_5$)$_3$N | 10.1 | C$_9$H$_9$Cl$_3$O$_2$S | 28.65 | 100 | 37.5–38.5 |
| 3 | C$_6$H$_5$SH | 11.02 | 23.4 | (C$_2$H$_5$)$_3$N | 10.1 | C$_{11}$H$_5$Cl$_3$O$_2$S | 30.7 | 100 | 141.5–142.5 |
| 4 | n-C$_{12.4}$H$_{25.7}$SH | 20.8 | 23.4 | (C$_2$H$_5$)$_3$N | 10.1 | C$_{17.4}$H$_{25.7}$Cl$_3$O$_2$S | 40.5 | 100 | 45.5–49.5 |
| 5 | (C$_2$H$_5$)$_2$NH | 18.3 | 58.4 | (C$_2$H$_5$)$_2$NH | 18.3 | C$_9$H$_{10}$Cl$_3$NO$_2$ | 31.7 | 46.6 | 93.0–94.5 |
| 6 | C$_6$H$_5$OH | 4.71 | 11.7 | (C$_2$H$_5$)$_3$N | 5.1 | C$_{11}$H$_5$Cl$_3$O$_3$ | 13.62 | 93.6 | 95.0–96.0 |
| 7 | CH$_3$OH | 50.0 | 11.7 | (C$_2$H$_5$)$_3$N | 40.8 | C$_8$H$_{10}$Cl$_2$O$_5$ | 9.2 | 72.0 | 118.5–0.6 |
| 8 | (C$_2$H$_5$)$_2$NH | 100.0 | 5.85 | (C$_2$H$_5$)$_2$NH | | C$_{17}$H$_{31}$Cl$_2$N$_3$O$_2$ | 4.0 | 42.3 | 69.5–70.5 |
| 9 | (CH$_3$O)$_2$P(S)SH | 15.8 | 23.4 | (C$_2$H$_5$)$_3$N | 10.1 | C$_7$H$_6$Cl$_3$O$_4$S$_2$P | 12.2 | 34.4 | 107.5–109.5 |
| 10 | NaI | 7.5 | 11.7 | | | C$_5$Cl$_3$IO$_2$ | 15.0 | 92.3 | 116.0–118.5 |
| 11 | φCH$_2$SH | 12.4 | 23.4 | (C$_2$H$_5$)$_3$N | 10.1 | C$_{12}$H$_2$Cl$_3$O$_2$S | 32.2 | 100.0 | 85.0–86.0 |

| Ex. No. | Analysis | | | | | | | | | |
|---|---|---|---|---|---|---|---|---|---|---|
| | Calculated | | | | | Found | | | | |
| | C | H | Cl | S | N | C | H | Cl | S | N |
| 2 | 37.6 | 3.2 | 37.0 | 11.1 | | 37.4 | 3.2 | 36.5 | 10.7 | |
| 3 | 42.1 | 1.6 | 34.6 | 10.4 | | 42.8 | 1.7 | 34.4 | 10.9 | |
| 4 | 51.6 | 6.4 | 26.1 | 7.9 | | 51.4 | 6.2 | 26.4 | 7.7 | |
| 5 | 40.0 | 3.7 | 39.3 | | 5.2 | 39.9 | 3.9 | 39.1 | | 5.1 |
| 6 | 45.3 | 1.7 | 36.5 | | | 45.4 | 1.8 | 36.2 | | |
| 7 | 37.4 | 3.9 | 27.6 | | | 37.5 | 4.0 | 27.7 | | |
| 8 | 53.8 | 8.2 | 18.7 | | 11.1 | 53.5 | 8.2 | 18.5 | | 10.6 |
| 9 | 23.6 | 1.7 | 29.9 | 18.3 | | 23.8 | 1.7 | 29.1 | 18.5 | |
| 10 | 18.5 | | 32.7 | | | 18.4 | 0.1 | 33.3 | | |
| 11 | | | 33.1 | 10.0 | | | | 33.0 | 10.2 | |

EXAMPLE 12

To 4.7 parts of 6-methylthio-3,4,5-trichloro-2H-pyran-2-one dissolved in methylene chloride were added 4 parts of peracetic acid. The addition took place over a period of ten minutes during which time the temperature of the reaction mixture was maintained at 25–30 degrees centigrade. After the completion of the addition, the mixture was allowed to stand for two hours. Thereafter, the mixture was triturated with water and the organic layer dried and evaporated to yield 4.3 parts of white crystal, which, after recrystallization from methylene chloride had a melting point of 220.5–221 degrees centigrade.

Elemental analysis of the product showed that it was composed of 26.07 percent carbon, 0.97 percent hydrogen, 38.1 percent chlorine, and 11.47 percent sulfur, indicating that the compound had the formula:

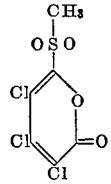

The reaction is shown below:

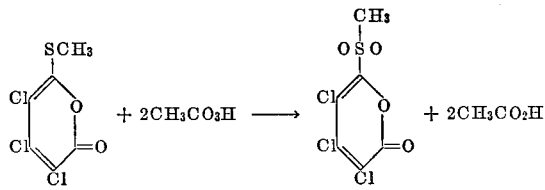

EXAMPLE 13

To 12.3 parts of 6 - methylthio - 3,4,5 - trichloro--2H-pyran-2-one, dissolved in methylene chloride, there were added 8.63 parts of meta-chloroperbenzoic acid. During the addition, the temperature of the reaction mixture was maintained at 20–30 degrees centigrade. After completion of the addition, the mixture was allowed to stand overnight. Thereafter, the mixture was evaporated, the resultant solids triturated with ethanol to remove the meta-chlorobenzoic acid, filtered and dried. After recrystallization from methanol, 2.65 parts of white crystals were obtained having a melting point of 167.5–168 degrees centigrade.

Elemental analysis of the product showed that it was composed of 12.29 percent sulfur and 39.8 percent chlorine, indicating that the compound had the formula:

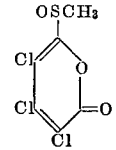

The reaction is shown below:

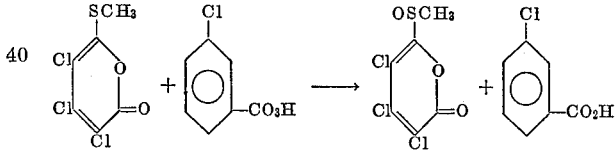

In Examples 14–34, substituted perhalocoumalin compounds and derivatives thereof were subjected to tests to determine whether they possessed pesticidal activity. The following test methods were used:

Spray tests (fungicides)

*Early blight.*—Tomato plants were sprayed with 100 milliliters of the chemical to be tested, dried, inoculated with spores of *Alterarnaria solani*, and incubated in a moist chamber at 70 degrees Fahrenheit for 24 hours. Control plants were not sprayed with the chemical. Percent control was determined by the formula:

$$100 \times \frac{\text{(number of spots which develop on leaves of untreated tomato plant—number of spots which develop of leaves of treated plant)}}{\text{number of spots which develop on leaves of untreated plant}}$$

*Mildew.*—Ten day old tendergreen bean plants were allowed to take natural infection of *Erysiphe polygoni* from older infected plants. After the infection began to show on the leaves, the plants were sprayed with the chemical to be tested, dried, and kept in a greenhouse. Control plants were subjected to the aforementioned natural infection and kept in a greenhouse. When the control plants developed the disease, the test plants were removed from the greenhouse and inspected for infection.

Soil fungicide tests

*Pythium test.*—Soil naturally infested with Pythium species was treated with the chemical solution to be tested and allowed to stand 3 days before planting. Plastic pots 3.5 inches x 3.0 inches were filled with the soil, and the chemical was applied to the soil therein by drenching. After 3 days, ten pea seeds, Perfection variety, were planted in each pot. Percent emergence was recorded.

*Rhizoctonia test.*—Sterilized soil was inoculated with Strain #85 of *Rhizoctonia solani*, placed in 3.5 inches x 3.5 inches plastic pots, drenched with the chemical to be tested, and allowed to stand 3 days. Thereafter 5 Tendergreen bean seeds were planted in each pot. The number of plants developing infection was recorded.

*Fusarium test.*—Sterilized soil was inoculated with *Fusarium oxysporum lycopersici*, and treated with the chemical to be tested. Three days thereafter, five small tomato seedlings were planted in the soil. Fifteen days after said planting, the number of plants showing infection was recorded.

*Sclerotium test.*—Sterilized soil was inoculated with *Sclerotium rolfsii*, treated with the chemical to be tested, and incubated in moist chambers at 70 degrees Fahrenheit for three days. Perfection variety peas were then planted in said soil, and the per cent emergence was recorded.

*Nematode test.*—Sterilized soil was inoculated with galls formed by *Meloidogyne incognita* on tomato roots, treated with the chemical to be tested, and allowed to stand for two or three days until it was dry enough for mixing. In such soil cucumber seeds were then planted, and the roots thereof were examined 10 to 15 days after planting for infection.

Spray tests (insecticides)

*Aphid test.*—Ten-day-old Nasturtium plants were infested with black bean aphids (*Aphis fabae Scop.*) so that the first two leaves had from 50–100 aphids, sprayed with the chemical to be tested, and caged in a piece of tubing which is coated with talcum powder to prevent the escape of the aphids. Mortality was recorded by counting the number of dead aphids.

*Mite test.*—Young pole lima bean plants (Sieva variety) were infested with 50 to 100 adult mites (*Tetranychus telarius L.*) on both primary leaves, sprayed 24 hours thereafter with the chemical to be tested, and placed in the greenhouse for from 24 to 48 hours, after which mortality was recorded by counting the number of dead mites.

*Mexican bean beetle and armyworm tests.*—Primary leaves of lima bean plants were excised, dipped into a solution of the chemical to be tested, and dried. Either 5 larvae (fourth instar) of the Mexican bean beetle (*Epilachna varivestis* Muls.) or five larve (second instar) of the Southern Armyworm (*Prodenia eridania* Cram), depending upon the test to be performed, were placed thereon, and the leaves were so enclosed that the insects could not escape. Mortality was recorded by counting the number of dead larvae, and the per cent leaf consumed by the larvae was estimated.

*House fly test.*—Newly hatched adult house flies (*Musca domestica L.*) were, while under the action of carbon dioxide, immersed in the chemical solution to be tested, shaken for a few seconds, and screened out into a paper cup containing filter paper which was dipped in sugar solution, said cup then being covered to prevent escape of the flies. Ten flies were used per treatment. Data was taken on the number of flies killed in two hours, and killed in 24 hours.

*Bactericidal test.*— The bacteria to be tested were grown on agar slants for 20 hours. To a mixture of the chemical to be tested and nutrient agar was added two drops of the bacterial suspension, and this mixture was shaken and then poured onto sterilized Petri plates. The plates were incubated for 24 hours, and the bacterial growth noted.

EXAMPLE 14

The perhalocoumalin derivative of the formula:

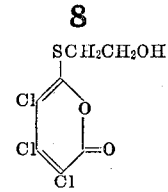

exhibited complete control of Pythium at a concentration of 64 per acre (i.e., there was 100 percent emergence of the pea seeds). At 64 pounds per acre concentration there was complete control of both Rhizoctonia and Sclerotium (none of the inoculated plants developed infection). At 255 parts per million concentration there was complete control of the bacteria *Pseudomonas phaseolicola* (Gram — ), and at a concentration of 76 parts per million there was complete control of the bacteria *Xanthomonas phaseoli* (Gram — ).

EXAMPLE 15

The perhalocoumalin derivative of the formula:

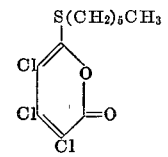

exhibited complete control of the bacteria *Pseudomonas phaseolicola* (Gram — ) at a concentration of 255 parts per million, and at a concentration of 1000 parts per million killed 100 percent of the houseflies within 24 hours.

EXAMPLE 16

The perhalocoumalin derivative of the formula:

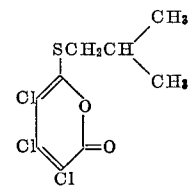

exhibited complete control of the bacteria *Staphylococcus aureus* (Gram + ), and *Pseudomonas phaseolicola* (Gram — ) at concentrations of 255 parts per million and 76 parts per million, respectively, and at a concentration of 1000 parts per million killed 100 percent of the houseflies within 24 hours.

EXAMPLE 17

The perhalocoumalin derivative of the formula:

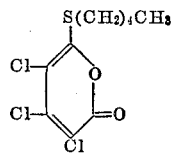

exhibited complete control of *Staphyloccocus aureus* (Gram + ) and *Pseudomonas phaseolicola* (Gram — ) at a concentration of 255 parts per million. At a concentration of 1000 parts per million, it killed 20 percent of the southern armyworm, and at the same concentration it killed 100 percent of the houseflies within 24 hours.

EXAMPLE 18

The perhalocoumalin derivative of the formula:

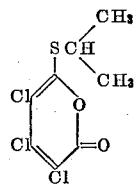

exhibited complete control of *Staphylococcus aureus* (Gram +), *Pseudomonas phaseolicola* (Gram −), and *Xanthomonas phaseoli* (Gram −) at a concentration of 255 parts per million. At a concentration of 1000 parts per million it killed 24 percent of the aphids and 100 percent of the mites, and of the same concentration it killed 100 percent of the houseflies within two hours.

EXAMPLE 19

The perhalocoumalin derivative of the formula:

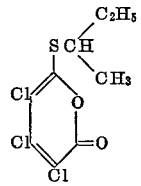

exhibited complete control of *Staphylococcus aureus* (Gram +), *Pseudomonas phaseolicola* (Gram −), and *Xanthomonas phaseoli* (Gram −) at concentrations of 255, 38, and 255 parts per million, respectively. At 1000 parts per million concentration it killed 100 percent of the mites, and at the same concentration killed 100 percent of the houseflies within two hours.

EXAMPLE 20

The perhalocoumalin derivative of the formula:

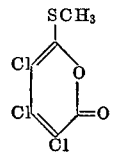

exhibited 80 percent control of Pythium at a concentration of 64 pounds per acre. It killed 29 percent of the aphids and 90 percent of the mites at concentrations of 1000 and 290 parts per million, respectively. At a concentration of 1000 parts per million it killed 100 per cent of the houseflies within two hours.

EXAMPLE 21

The perhalocoumalin derivative of the formula:

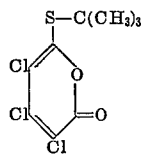

killed 30 percent of the aphids and 70 percent of the mites at a concentration of 100 parts per million. At the same concentration it killed 100 percent of the flies within two hours.

EXAMPLE 22

The perhalocoumalin derivative of the formula:

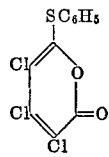

exhibited complete control of Pythium and Sclerotium at concentrations of 64 and 16 pounds per acre, respectively. It killed 38 percent of the aphids at a concentration of 1000 parts per million.

EXAMPLE 23

The perhalocoumalin derivative of the formula:

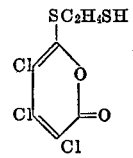

killed 40 percent of the Southern armyworm and 100 percent of the Mexican bean beetle at concentrations of 1000 and 500 parts per million, respectively.

EXAMPLE 24

The perhalocoumalin derivative of the formula:

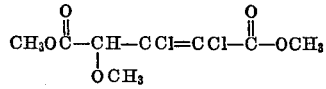

killed 60 percent of the Mexican bean beetle at a concentration of 1000 parts per million.

EXAMPLE 25

The perhalocoumalin derivative of the formula:

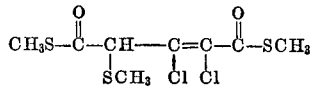

killed 100 percent of the Mexican bean beetles and 15 percent of the aphids at concentrations of 1000 and 250 parts per million, respectively.

EXAMPLE 26

The perhalocoumalin derivative of the formula:

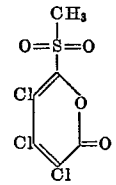

exhibited complete control of Pythium and Rhizoctonia at a concentration of 64 pounds per acre. At concentrations of 255 and 38 parts per million, respectively, it exhibited complete control of the bacteria *Staphylococcus aureus* (Gram +) and *Xanthomonas phaseoli* (Gram −).

EXAMPLE 27

The perhalocoumalin derivative of the formula:

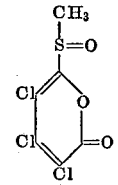

exhibited complete control of Rhizoctonia, *Staphylococcus aureus* (Gram +), *Pseudomonas phaseolicola* (Gram −), and *Xanthomonas phaseoli* (Gram −) at concentrations of 64 pounds per acre, 255 parts per million, 76 parts per million, and 76 parts per million, respectively.

EXAMPLE 28

The perhalocoumalin derivative of the formula:

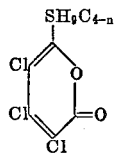

exhibited complete control of Sclerotium, *Staphylococcus aureus*, (Gram +) *Pseudomonas phaseolicola* (Gram —), and *Xanthomonas phaseoli* (Gram —) at concentrations of 64 pounds per acre, 255 parts per million, 76 parts per million, and 255 parts per million, respectively. It killed 100 percent of the mites at a concentration of 250 parts per million, and it killed 50 percent of the houseflies within 24 hours at a concentration of 1000 parts per million.

EXAMPLE 29

The perhalocoumalin derivative of the formula:

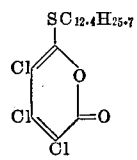

exhibited complete control of Pythium and Sclerotium at a concentration of 64 pounds per acre.

EXAMPLE 30

The perhalocoumalin derivative of the formula:

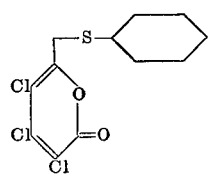

exhibited complete control of Sclerotium at a concentration of 64 pounds per acre. It killed 100 percent of the houseflies within two hours and 100 percent of the mites at a concentration of 1000 parts per million.

EXAMPLE 31

The perhalocoumalin derivative of the formula:

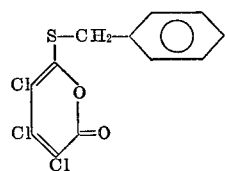

exhibited complete control of Pythium, Rhizoctonia, Sclerotium, and *Staphylococcus aureus* (Gram +) at concentrations of 64 pounds per acre, 64 pounds per acre, 64 pounds per acre, and 255 parts per million, respectively.

EXAMPLE 32

The perhalocoumalin derivative of the formula:

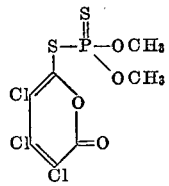

exhibited complete control of *Staphylococcus aureus* (Gram +) and *Pseudomonas phaseolicola* (Gram —) at concentrations of 255 and 76 parts per million respectively. It killed 42 percent of the mites at a concentration of 1000 parts per million.

EXAMPLE 33

The perhalocoumalin of the formula:

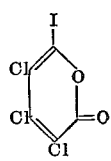

exhibited complete control of *Staphylococcus aureus* (Gram +), *Escherichia coli* (Gram —), *Pseudomonas phaseolicola* (Gram —), and *Xanthomonas phaseoli* (Gram —) at concentrations of 255, 255, 76, and 76 parts per million respectively. It killed 65 percent of the aphids, 100 percent of the mites, and 50 percent of the houseflies within 24 hours at a concentration of 1000 parts per million.

EXAMPLE 34

The perhalocoumalin derivative of the formula:

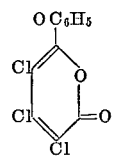

exhibited complete control of Fusarium and *Pseudomonas phaseolicola* (Gram —) at concentrations of 64 pounds per acre and 255 parts per million, respectively. It killed 50 percent of the aphids at a concentration of 1000 parts per million.

What is claimed is:
1. A compound of the formula: $X(R)_n$

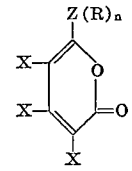

wherein X is a halogen selected from the group consisting of chlorine and bromine;

$(R)_nZ$ is a substituent in which the following relationship exists

| If $n$ is— | Z may be— |
|---|---|
| 1 | Oxygen, sulfur. |
| 2 | Nitrogen. |
| 3 | Carbon. | and wherein R is selected from the group consisting of (a) hydrogen; (b) straight or branched chain alkyl of 1 to 6 carbon atoms provided that Z is sulfur; (c) cyclohexyl; (d) phenyl or benzyl; (e) —CH$_2$CH$_2$OR or —CH$_2$CH$_2$SH; and (f)

when Z is oxygen or sulfur.
2. The compound of claim 1 wherein;
 (a) X is chlorine;
 (b) Z is selected from the group consisting of oxygen, sulfur, nitrogen and carbon; and
 (c) R is selected from the group consisting of straight or branched chain alkyl of 1 to 6 carbon atoms, phenyl, benzyl, cyclohexyl

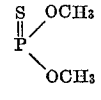

3. The compound of claim 2, wherein Z is sulful and R is straight or branched chain alkyl of 1 to 6 carbon atoms.
4. The compound of claim 2, wherein R is alkyl of 1 to 5 carbon atoms.
5. The compound of claim 4, wherein R is methyl.

6. A compound selected from the group consisting of

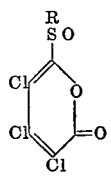

and

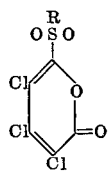

wherein R is straight or branched chain alkyl of 1 to 6 carbon atoms.

7. A process for making a compound of the formula:

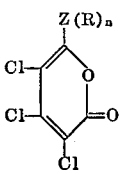

wherein;
(a) Z is selected from the group consisting of oxygen, sulfur, nitrogen and carbon;
(b) R is selected from the group consisting of hydrogen straight or branched chain alkyl of 1 to 6 carbon atoms, $-CH_2CH_2SH$, phenyl, benzyl, cyclohexyl

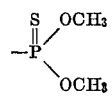

and
$-CH_2CH_2OH$; and
(c) $n$ is 1 when Z is oxygen or sulfur, $n$ is 2 when Z is nitrogen, and $n$ is 3 when Z is carbon; comprising the step of reacting

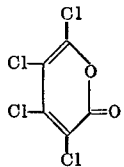

with a compound of the formula $(R)_nZH$ in the presence of a base which is more weakly neucleophilic than the $(R)_nZH$ compound.

8. The process of claim 7 wherein Z is sulfur and R is alkyl of 1 to 6 carbon atoms.

References Cited

Chemical Abstracts, 55:18767h.

ALEX MAZEL, Primary Examiner

A. M. T. TIGHE, Assistant Examiner

U.S. Cl. X.R.

260—484, 455; 414—279, 301, 314

PO-1050
(5/69)

UNITED STATES PATENT OFFICE
CERTIFICATE OF CORRECTION

Patent No. 3,528,995      Dated September 15, 1970

Inventor(s)   Victor Mark et al.

It is certified that error appears in the above-identified patent and that said Letters Patent are hereby corrected as shown below:

Column 1, line 65, that portion of the formula reading

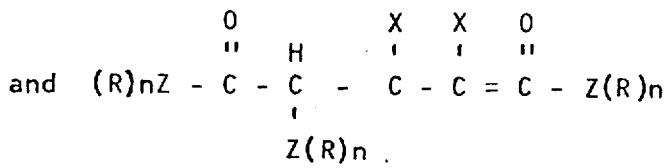

should read

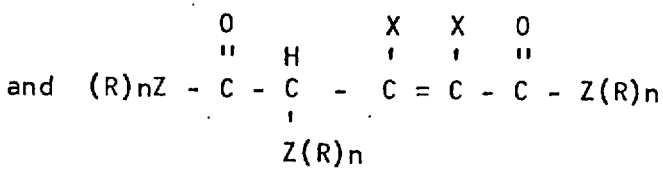

Column 3, line 30, "aicd" should read --- acid ---; line 57, "percusor" should read --- precursor ---. Column 4, line 26, "sulfonate" should read --- sulfone ---; line 49, "23:4" should read --- 23.4 ---; line 70, the formula should be corrected to read

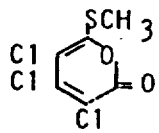

Column 6, Table I, under heading M.P., °C. or B.P., °C. mm., (Example 4), "45.5-49.5" should read --- 45.5-47.5 ---. Column 5, Table I, under heading Parts Used, (Example 7), "50.0" should read --- 150 ---. Column 9, line 6, "of the same" should read --- at the same ---; line 58, "100 parts" should read --- 1000 parts ---. Column 12, line 27, Claim 1, "formula: X(R)n" should read --- formula: ---; line 48, " -CH2CH2OR " should read --- -CH2CH2OH ---; line 65, Claim 2, the formula should be corrected to read

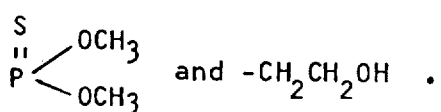

line 70, Claim 3, "Z is sulful" should read --- Z is sulfur ---.

Signed and sealed this 15 day of June 1971.

(SEAL)
Attest:

EDWARD M. FLETCHER, JR.
Attesting Officer

WILLIAM E. SCHUYLER, JR.
Commissioner of Patents